United States Patent [19]

Cumbo et al.

[11] 3,873,451

[45] Mar. 25, 1975

[54] FLAME RETARDANT ANTIMONY COMPOUNDS

[75] Inventors: Charles Carmen Cumbo; Paul C. Yates, both of Wilmington, Del.

[73] Assignee: E. I. du Pont de Nemours and Company, Wilmington, Del.

[22] Filed: Mar. 7, 1973

[21] Appl. No.: 338,686

Related U.S. Application Data

[62] Division of Ser. No. 93,832, Nov. 30, 1970, Pat. No. 3,763,202.

[52] U.S. Cl................ 252/8.1, 106/15 FP, 117/136, 161/403, 260/429.7, 260/429.9, 260/446
[51] Int. Cl.............................................. C09k 3/28
[58] Field of Search ............. 252/8, 8.1; 260/429.7, 260/429.9, 446

[56] References Cited
UNITED STATES PATENTS

| | | | |
|---|---|---|---|
| 3,676,476 | 7/1972 | Randolph | 252/8.1 X |
| 3,676,477 | 7/1972 | Chay et al. | 252/8.1 X |
| 3,763,202 | 10/1973 | Cumbo et al. | 252/8.1 X |

*Primary Examiner*—Leland A. Sebastian

[57] ABSTRACT

Esters of pentavalent antimony with aliphatic polyhydroxy compounds having vicinal hydroxyl groups, salts of the esters with zinc and stannous oxides and hydroxides, and mixed esters of trivalent and pentavalent antimony with aliphatic polyhydroxy compounds having vicinal hydroxyl groups, are effective flame retardants for organic polymers such as polyacrylonitrile. The esters and salts are soluble in solvents commonly used for processing the polymers, and hence can be conveniently incorporated into the polymers.

9 Claims, No Drawings

FLAME RETARDANT ANTIMONY COMPOUNDS

This is a Continuation, Division of Application Ser. No. 93,832, filed Nov. 30, 1970, now U.S. Pat. No. 3,763,202.

BACKGROUND OF THE INVENTION

Glycerine and glycol esters of trivalent antimony are known. Such compounds have been incorporated into polymers to give improved flame resistance. These compounds, however, are not soluble in the polar organic solvents commonly used to dissolve polymers for casting or spinning, and therefore cannot conveniently be incorporated into films or fibers of the polymers.

SUMMARY OF THE INVENTION

In one embodiment this invention is a class of novel esters of pentavalent antimony with aliphatic polyhydroxy compounds having 2 to 6 carbon atoms and vicinal hydroxyl groups. The compounds are defined by the following structural formula:

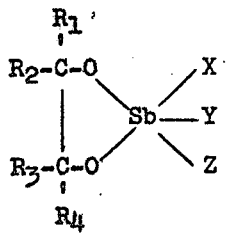

wherein $R_1$, $R_2$, $R_3$ and $R_4$ are hydrogen, alkyl of 1 through 4 carbon atoms, or hydroxyalkyl of 1 through 4 carbon atoms, with the proviso that the total number of carbon atoms in $R_1$, $R_2$, $R_3$ and $R_4$ does not exceed 4;

Z is chloro, bromo, iodo, hydroxyl, or alkoxy of 1 through 4 carbon atoms;

X and Y when taken separately are the same or different and are chloro, bromo, iodo, or alkoxy of 1 through 4 carbon atoms and when taken together are

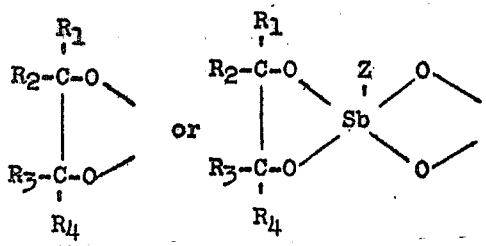

wherein $R_1$, $R_2$, $R_3$, $R_4$ and Z are as defined above.

Pentavalent antimony tends to be six-coordinated, so the compounds of the invention will ordinarily be associated with a mole of a complexing substance to satisfy the sixth coordination position. Substances which can be coordinated with the antimony are those which contain an electron donating atom, such as oxygen or nitrogen, in their molecules. Examples of substances which will frequently be coordinated with the compounds of the invention are water, alcohols, especially lower aliphatic alcohols, and aliphatic polyhydroxy compounds, especially those containing 2 through 6 carbon atoms and having vicinal hydroxyl groups.

The invention also includes salts of the above esters with zinc oxide and hydroxide and stannous oxide and hydroxide. The invention also includes pentavalent esters of the above structural formula in admixture with trivalent antimony esters of polyhydroxy organic compounds having vicinal hydroxyl groups with the proviso that at least 20 mole percent of the total antimony content of the mixed esters be a pentavalent ester of the structure defined above.

These esters and salts are soluble in the polar organic solvents which are most suited for processing organic polymers, and can therefore be conveniently incorporated into the polymers. They do not flocculate polymers such as polyacrylonitrile and they do not deluster fibers or films made from polymers containing them. They impart excellent flame resistance to the polymers, and they are resistant to extraction with hot water.

The invention also includes a method of preparing the above esters and salts which involves oxidizing an antimony trihalide with nitric acid at a temperature below 100°C. to provide a hydrated oxide of pentavalent antimony, then reacting the hydrated oxide with an aliphatic polyhydroxy compound containing 2 through 6 carbon atoms and having vicinal hydroxyl groups to provide the desired ester, then, optionally, converting the ester to a salt by reaction with zinc oxide or hydroxide or stannous oxide or hydroxide.

Mixed esters or ester salts of the pentavalent esters of the invention with esters of trivalent antimony polyhydroxy organic compounds containing vicinal hydroxyl groups may also optionally be formed by dissolving the otherwise insoluble trivalent antimony ester compound in a solution containing sufficient pentavalent ester of the invention to ensure that the total composition will contain at least 20 mole percent of the total antimony present in the form of a pentavalent ester.

The invention further includes solutions of the above esters and salts in certain polar organic solvents which are solvents for synthetic organic polymers; a method for imparting flame resistance to shaped articles, such as fibers and films, of synthetic organic polymers, involving mixing the solutions of the invention with solutions of the polymers prior to formation of the shaped articles; and flame-resistant shaped articles of synthetic organic polymers containing an ester or salt of this invention.

DESCRIPTION OF THE INVENTION

Synthesis

The esters of this invention can be made by a process which comprises:

1. oxidizing an antimony trihalide with nitric acid at a temperature below 100°C. to provide a hydrated oxide of pentavalent antimony;

2. reacting the hydrated oxide with an aliphatic polyhydroxy compound containing 2 through 6 carbon atoms and having vicinal hydroxyl groups. The oxidation of step (1) should be carried out at as low a temperature as is consistent with a reasonable reaction rate. Temperatures in excess of 100°C. lead to polymerization and particle growth. A temperature in the range of 60° to 80°C. is preferred for the oxidation. In this range the reaction is rapid and a highly reactive form of hydrated pentavalent antimony oxide results. The exact reaction which takes place is probably complex, but reaction 1 illustrated below is believed to be the primary reaction:

1. $SbCl_3 + 2HNO_3 + 3H_2O \rightarrow Sb(OH)_5 + N_2O_4 + 3HCl$

There are indications of contributions from a second reaction, which can be written as:

1a. $2SbCl_3 + 10HNO_3 \rightarrow 2Sb(OH)_5 + 5N_2O_4 + 3Cl_2$

Reaction (1) requires 2 moles of nitric acid per mole of antimony, while reaction (1a) requires 5 moles of nitric acid per mole of antimony. To take care of the possibility that reaction (1a) occurs to some extent, an excess of nitric acid is used when it is desired to produce $Sb(OH)_5$. The excess nitric acid is destroyed by reducing with a suitable reducing agent such as formaldehyde.

Even when using an excess of nitric acid it is difficult to remove all of the halogen to produce pure $Sb(OH)_5$. The product is usually $SbCl(OH)_4$ or a mixture of $SbCl(OH)_4$ and $Sb(OH)_5$. Thus, when halogen-free $Sb(OH)_5$ is desired, it is preferably produced by an alternate route, described hereinbelow.

The nitric acid oxidation can be used to produce a hydrated pentavalent antimony oxide containing 1, 2 or 3 halogens as predominant product by assuming that reaction 1 above is the only reaction which occurs and adjusting the amount of water present in accordance with illustrative reactions 1b, 1c, and 1d:

1b. $SbCl_3 + 2HNO_3 \rightarrow Sb(OH)_2Cl_3 + N_2O_4$
1c. $SbCl_3 + 2HNO_3 + H_2O \rightarrow Sb(OH)_3Cl_2 + N_2O_4 + HCl$
1d. $SbCl_3 + 2HNO_3 + 2H_2O \rightarrow Sb(OH)_4Cl + N_2O_4 + 2HCl$ The reactions of step (2) are illustrated by the following equations for the reactions between ethylene glycol (E.G.) and the products of the nitric acid oxidation of $SbCl_3$:

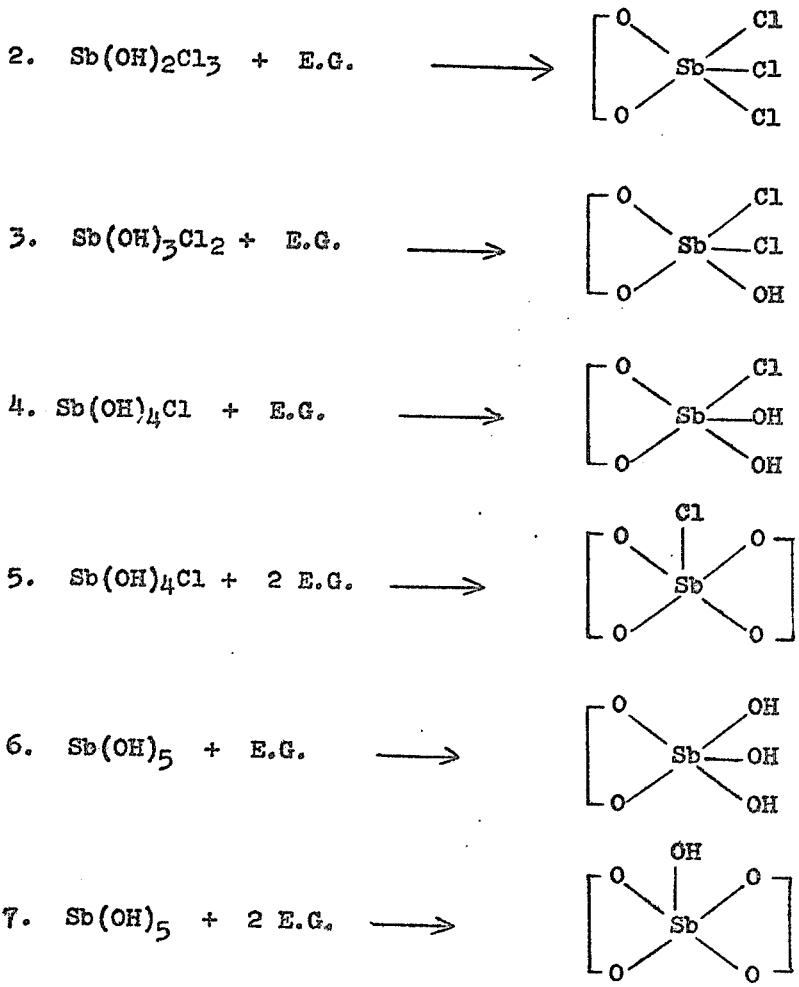

The products of reactions 4 and 6 containing more than 1 hydroxyl group tend to dimerize as illustrated by the following:

8. 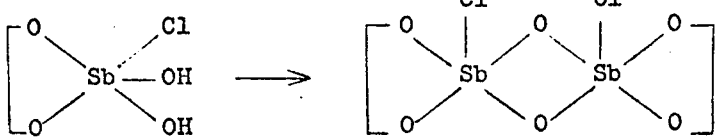
9. 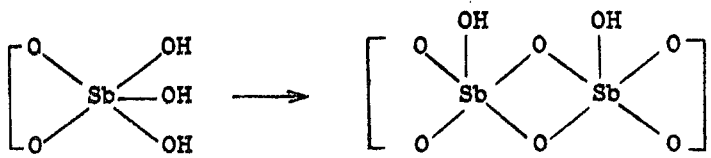
If desired, the products of 4 and 6 can be stabilized against dimerization by conversion of all or all but one of the hydroxyl groups to alkoxy groups by reaction with aliphatic alcohols containing 1 through 4 carbon atoms, as illustrated by the following esterification reactions with ethanol (EtOH):
10. 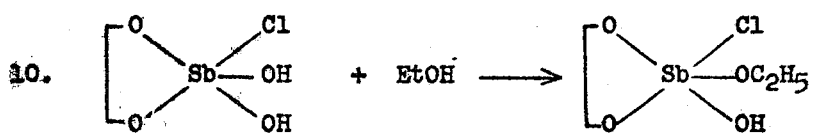
11. 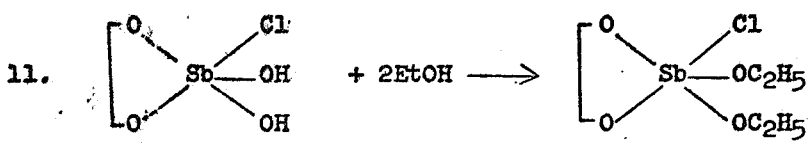
12. 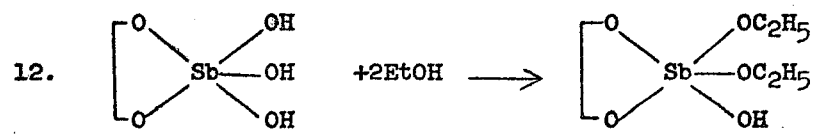
13. 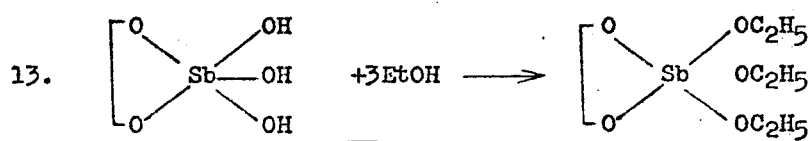

If desired, the products of reactions 3, 5 and 8 can also be esterified as illustrated by the following:

14. 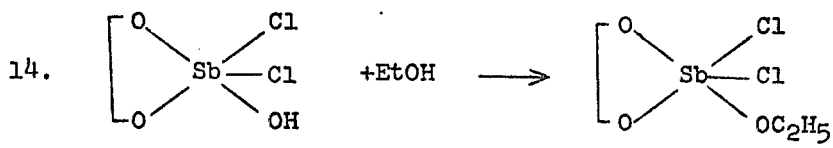

15. 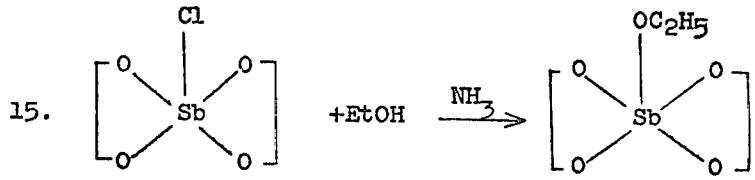

16. 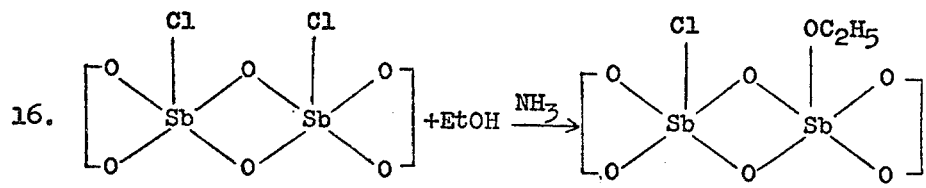

17. 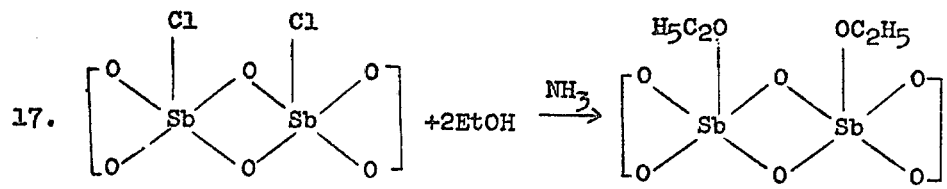

As indicated, reactions 15, 16 and 17 require the presence of ammonia. The preferred esterifying alcohols are methanol and ethanol.

The esters of the invention are acidic and readily form salts with more basic metal cations. Thus, the salts of the invention can be formed simply by dissolving zinc or stannous oxide or hydroxide in solutions of the esters in polar organic solvents. This is illustrated by conversion of the product of reaction 5 to its salt with zinc oxide:

18. 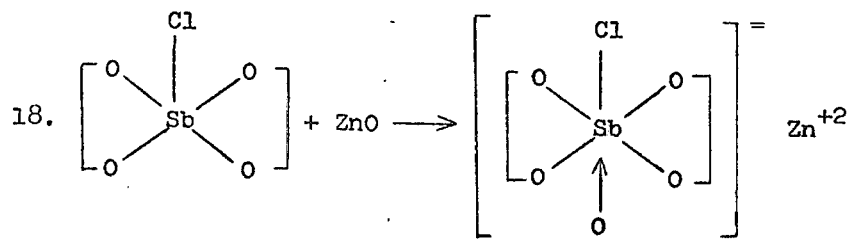

An alternative process for making the compounds of the invention involves:

1. hydrolyzing an antimony pentaalkoxide in a polar organic solvent such as dimethylformamide (DMF) to form antimony pentahydroxide, then
2. reacting the pentahydroxide with an aliphatic polyhydroxy compound containing 2 through 6 carbon atoms and having vicinal hydroxyl groups.

The hydrolysis of step (1) is illustrated by the following equation for the hydrolysis of antimony pentaethoxide [Sb(OEt)$_5$]:

19. 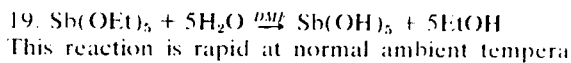

This reaction is rapid at normal ambient temperatures. It produces a large amount of white, insoluble Sb(OH)$_5$ which is halogen-free. This route is therefore preferred for producing Sb(OH)$_5$, since it is difficult to remove all of the halogen by the nitric oxide oxidation route, as mentioned above. Further, it is a convenient route, because the antimony pentaethoxide can be easily prepared and purified by the procedure described in Bulletin of the Chemical Society of France, 10, 2962–2965 (1965).

Addition of the aliphatic polyhydroxy compound to the hydrolysis reaction mass dissolves some of the solid Sb(OH)$_5$. Heating the solution to 100°–125°C. and removing the water of reaction under vacuum produces a clear colorless solution. Use of 1 mole of aliphatic polyhydroxy compound per mole of Sb(OH)$_5$ results in formation of an ester containing 1 five-membered ring; use of 2 or more moles produces an ester having 2 five-membered rings. The reactions are illustrated by the following equations for the reaction of Sb(OH)$_5$ with ethylene glycol:

20.  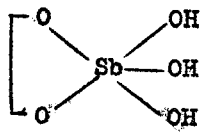

21.  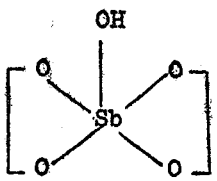

If larger amounts of ethylene glycol are used, i.e. over 2 moles per mole of antimony, there will be excess ethylene glycol present. Part of this probably coordinates with the antimony esters under some conditions (without reacting to split out water) so that the antimony can become 6-coordinate toward oxygen. Glycol may also serve as the solvent for the esters and may be present with the esters in solutions in other polar solvents.

The reaction product of equation 20 can be converted to a product containing 1, 2, or 3 halogens by treating with an appropriate amount of a hydrogen halide to replace an equivalent number of hydroxyl groups. To illustrate:

22. 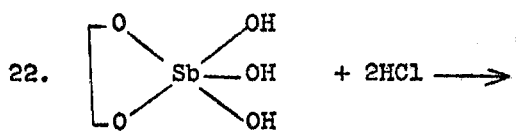 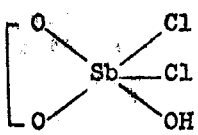

The hydroxyl group of the reaction product of equation 21 can also be replaced by halogen by treatment with a hydrogen halide.

The reaction products of equations 20 and 21 can also be esterified with a short chain aliphatic alcohol, as illustrated by equations 12, 13 and 15. Sequential tratment of the product of equation 20 with appropriate amounts of both hydrogen halide and aliphatic alcohol, provides compounds containing 1 or 2 alkoxide groups, 1 or 2 halogens, and 0 or 1 hydroxyl groups. To illustrate:

23. 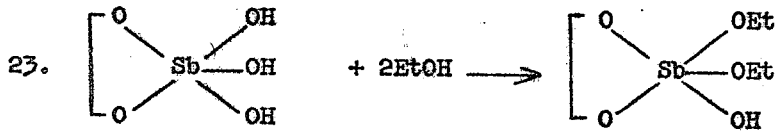

24. 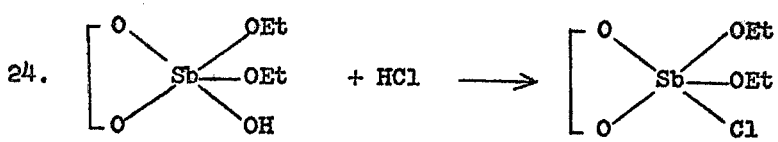

Examples of suitable aliphatic polyhydroxy compounds for use in preparing the esters of this invention include ethylene glycol, glycerol, 1,2-propanediol, 1,2-butanediol, and 2,3-butanediol. Ethylene glycol and glycerol are preferred.

The pentavalent ester compositions of the invention containing polyhydroxy compounds with vicinal hydroxyl groups are, as previously noted, quite acidic and, as also previously noted, can be employed as complex acids to dissolve relatively basic species such as zinc oxide or stannous oxide or their hydroxides. They are also sufficiently acidic that they will dissolve otherwise insoluble compounds of trivalent antimony esters.

Trivalent antimony esters with polyhydroxy alcohols containing vicinal hydroxyl groups are known in the art and have previously been employed to prepare flame retardant compositions. This is disclosed, for example, in British Pat. No. 837,696 to Leslie Williams and Richard Sidlow, who show the use either of trivalent antimony alkoxides or trivalent antimony glycoxides. Such trivalent antimony esters, however, are not appreciably soluble in many of the polar organic solvents which are also good solvents for a variety of industrially important organic polymers, such as polyacrylonitrile and nylon, for example. In addition, such compounds are highly sensitive to even minute amounts of water and hydrolyze very rapidly to give large particles which cause delustering, pluggage of spinnerettes and filters and lower efficiency as flame retardants.

Trivalent antimony is sufficiently basic, however, particularly when esterified with a polyhydroxy organic compound having vicinal hydroxyl groups, that it can be solubilized in such solvents by the addition of substantial amounts of the acidic pentavalent esters of this invention. The solubility increases as a function of the total percentage of antimony in the pentavalent state, and it is found that for significant levels of solubility adequate to prepare compositions for the type of polymers discussed above, at least 20 mole percent of the total antimony present must be in the form of a pentavalent ester of the invention.

It is thought that the "mixed esters" of this invention are not mere physical mixtures of esters of trivalent antimony with esters of pentavalent antimony, because the products are soluble to an appreciable extent in polar organic solvents such as DMF and DMSO, whereas the trivalent antimony esters have very low solubility. As indicated above the two species may form a salt which is more soluble in polar organic solvents than the $Sb^{+3}$ species alone. Further, when esters of trivalent antimony are formed with polyhydroxy compounds such as ethylene glycol or glycerol, the possibility exists for the formation of polymers in which one hydroxyl of the polyhydroxy compound is esterified with one trivalent antimony atom, while a second is esterified with a different trivalent antimony atom. In this manner, it is believed that bridges can be formed between two or more trivalent antimony atoms, and thus low molecular weight polymers of trivalent antimony may occur. Such polymeric species may then form salts with the acidic pentavalent antimony esters.

Alternatively, or perhaps additionally, bridges may be formed between a trivalent antimony species and a pentavalent antimony species by sharing a polyhydroxy compound between them. In any event, it wil be noted that the structure, while somewhat uncertain because of the many structural possibilities, will be characterized in that cyclic esters of pentavalent antimony having up to two coordinated groups of the vicinal hydroxy containing polyhydroxy compound will be present in at least 20 mole percent based on the weight of total antimony present. Compositions in which the percentage of pentavalent antimony esters of the invention is lower than this tend to show insufficient solubility in polar organic solvents, and susceptibility to hydrolysis by even small amounts of water similar to the trivalent antimony compounds of the prior art.

UTILITY

The acidic esters and salts of the invention can be dissolved in polar aliphatic organic solvents having high dielectric constants. In general, the solvents which can be used are organic acids, amides, polyalcohols, and dimethylsulfoxide. Suitable solvents are characterized by a dielectric constant of the solvent measured at 25°C. and at $10^3$ to $10^5$ cycles per second which exceeds 35 electrostatic units (ESU) and a ratio of carbon atoms in the solvent to hetero atoms such as oxygen, nitrogen and sulfur which is less than 1.7. Suitable solvents include formic acid, formamide, methylformamide, dimethylformamide, acetamide, ethylene glycol, glycerol, diethylene glycol, propanediols, such as 1,3-propanediol, and dimethylsulfoxide. Surprisingly, it is found that a variety of other polar solvents which do not simultaneously satisfy these criteria in regard to carbon to hetero atom ratio and dielectric constant, are not good solvents for the esters of this invention. For example, solvents such as ethanol, methanol, tetramethylurea, dimethylacetamide, acetonitrile, acetic acid, furfural, and methylformate, are not satisfactory solvents for the esters of the invention.

Precautions are sometimes necessary even with solvents which are suitable solvents for the esters of the invention. For example, if the method of preparation is such that free water is present in substantial amounts, the esters of the invention which are acidic may catalyze the hydrolysis of the solvent. This is particularly true of solvents such as formamide and methylformamide which hydrolyze easily in the presence of water and of acidic catalysts. In preparing solutions of the esters of the invention in such solvents, it is therefore desirable to remove excess water by distillation, displacement with alcohols, or other suitable means, before mixing the esters of the invention with the solvent. Such techniques will be illustrated in greater detail in examples of this invention.

The most preferred solvents are those which are also good solvents for organic polymers, such as dimethylformamide and dimethylsulfoxide, which are excellent solvents for polyacrylonitrile and copolymers of polyacrylonitrile with vinyl and vinylidene halides. Also preferred are solvents for polyamide polymers such as 66 nylon, which include formic acid, formamide, and mixtures of formamide with formic acid. Solvents which dissolve polyesters at high temperature are also preferred solvents of the invention, and these include ethylene glycol, glycerol, and diethylene glycol.

The esters and salts can be readily incorporated into a variety of organic polymers to impart flame resistance to shaped articles such as fibers, films and foams made from the polymers. Examples of polymers which can be made flame resistant by the esters and salts include: acrylonitrile polymers and copolymers of acrylonitrile with vinyl and vinylidene halides; polyamides; polyesters; polyacrylates; polyurethanes; vinyl chloride polymers such as polyvinyl chloride and copolymers of vinyl chloride and vinyl acetate; and acrylonitrile-butadiene-styrene copolymers. The term "copolymer" as used herein is intended to include polymers containing two or more monomeric species. A solution of the ester or salt is merely mixed with a solution of the polymer in a compatible (preferably the same) solvent. The concentration of the ester or salt in the solution prior to mixing with the polymer solution should be at least about 1 percent by weight, and can be as high as the limit of solubility of the particular ester or salt in the particular solvent selected. In general the concentration of ester or salt in the solution will be between about 2 and 30 percent by weight calculated as $Sb_2O_5$.

The amount to be incorporated into a polymer will vary somewhat with the nature of the polymer and the degree of flame resistance required, but will generally range between 0.5 percent and 20 percent, calculated as $Sb_2O_5$, by weight of the polymer. Loadings below 0.5 percent are often insufficient to achieve substantial improvements in flame resistance while amounts in excess of 20 percent are usually not required even with polymers most susceptible to burning.

Generally polymers containing organic halogens either as a copolymer or as an additive such as polyvinyl chloride, tetrabromophthalic anhydride, chlorinated or brominated waxes and terpenes, etc., respond most favorably to the antimony compounds of the invention, presumably because of the formation of volatile antimony halides and oxyhalides which interfere with flame propogation by trapping free radicals. For this reason, smaller amounts of antimony compounds are required when used in conjunction with organic halogens and highly flame resistant polymers can be prepared having only a few percent of the antimony esters of the invention.

The most preferred range is from 1 percent to about 10 percent calculated as percent $Sb_2O_5$ by weight in the composition when organic halogens are present and from about 5 percent to 19 percent in the absence of organic halogens.

After the solution of ester or salt is mixed with the polymer solution, the polymer can be processed in a conventional manner to make shaped articles. Thus, the solutions can be used directly for solution-spinning of fibers, casting of films, or preparation of foams, in the case of polymers such as polyacrylonitriles and polyurethanes which are conventionally processed in this manner. Alternatively the solvent can be removed and the polymer containing ester or salt of the invention can be melt extruded to form rods, pellets, fibers, or films, or molded to form other articles.

The compositions of the invention possess a unique combination of properties, particularly for applications as flameproofing additives for organic polymers. First, and as previously noted, they are soluble in and compatible with a variety of solvents which are commonly used for spinning and film casting of such polymers. This is in contrast to many prior art materials such as the glycol compounds of trivalent antimony, for example, which are not soluble in such solvents. Even the salts of the acidic esters of this invention are sufficiently soluble that they may be incorporated. This is in contrast to compositions such as potassium antimonyl tartrate, and similar metal salts of trivalent antimony which are insoluble in the solvents most suited for processing organic polymers.

The compositions of this invention are also compatible with the polymers themselves. This is important, because it allows the compositions to maintain an almost molecular state of subdivision and dispersion as the solvent is eliminated from the polymer. Thus, the compositions of this invention do not deluster films and fibers of polymers into which they are incorporated, nor interfere seriously with the mechanical properties of such polymers, as is the case with compositions of the prior art not showing such compatibility with organic polymers.

Because of the fine state of subdivision maintained as a result of this compatibility, the compositions of this invention are highly active on a unit weight basis and thus excel over prior art sources of antimony as flameproofing materials. For example, it has often been customary in the art to incorporate large particle size antimony oxide, antimony sulfide, and similar insoluble compounds into organic polymers. The large particle size of such prior art materials not only causes delustering and pluggage of spinnerettes and filter packs, but also leads to relatively low efficiency as flame retardants, since generally only the surface atoms in a large particle can participate in the chemical reactions which enhance flame resistance.

Some completely unanticipated advantages have been noted when the compositions of this invention are incorporated into organic polymers. For example, in copolymers of acrylonitrile with vinylidene chloride, vinyl chloride, and vinyl bromide, one of the problems ordinarily encountered even in the copolymer itself is color formation as a result of storage at elevated temperature. Surprisingly, the compositions of this invention function as substantial color stabilizers and such vinyl chloride copolymers with acrylonitrile are less highly colored than control samples which do not contain the acidic esters of the invention.

Finally, the compositions of this invention possess a very useful balance between excessive water sensitivity and permanence. Many compositions known in the prior art possess an undue sensitivity to water. Examples include simple pentavalent esters of antimony with lower alcohols such as antimony pentamethoxide or ethoxide, as well as antimony halides, such as antimony pentachloride. Such compositions are so water sensitive that unless even the most minute traces of moisture are absent, they cannot be processed without hydrolysis, followed by substantial particle growth which, in turn, leads to delustering, difficulties in spinning, and lowered efficiency as a flameproofing agent.

The opposite problem to water sensitivity occurs when compounds are so stable with respect to water that they can actually be dissolved in water and extracted from the organic polymer. Since the organic polymer fiber or film very often must be processed in the presence of large amounts of water, antimony compounds which cannot be hydrolyzed at all by water but are soluble in water, often are not suitable as permanent flame retardant treatments. For example, in the processing of polyacrylonitrile polymers and copolymers, one process involves spinning from a dimethylformamide solution with a partial evaporation of the solvent, followed by an extraction of the remainder of the solvent by a simultaneous washing and drawing operation in a 100°C. water bath. Since the fiber at this point still contains 30 percent solvent, any water soluble species sufficiently stable against hydrolysis to be extracted is likely to be removed by such a treatment. Even in polymer systems which are not subjected to this type of processing, other operations involve extended immersion in hot aqueous solutions; examples include washing and scouring operations which are encountered not only in processing, but in the end use of the fiber or fabric.

Thus, the compositions of this invention have an unusual balance of properties with respect to hydrolysis by water. They are sufficiently resistant to avoid premature hydrolysis due to traces of water during processing on the one hand, but can be hydrolyzed or insolubilized on exposure to aqueous solutions as in the wash-draw operations of polyacrylonitrile discussed above. The extent to which the compositions of the invention are susceptible to hydrolysis depends on the particular compound and the conditions. However, the antimony containing hydrolysis products are in an extremely fine size range, such that these particles do not scatter light, and thus do not lead to delustering of the fiber. Because the particle size of the hydrolysis products is so fine, they also maintain the high efficiency characteristic of a molecular or near molecular state of subdivision. Since the antimony oxide and hydrous oxide resulting from the hydrolysis is quite insoluble in aqueous solutions, the compositions of this invention are not extracted from the fiber once incorporated therein, and give a very permanent flameproofing treatment, even after repeated exposure to hot water in processing and in normal use conditions.

EXAMPLES

Some illustrative examples of the manner of making and using this invention are given below. In the examples, parts and percentages are by weight unless otherwise stated.

EXAMPLE 1

Two hundred twenty-eight parts of antimony trichloride are placed in a large evaporating dish to which are added 300 parts of concentrated 70 percent nitric acid. This is heated for 20 minutes at 80°C., during which the trivalent antimony is oxidized to pentavalent antimony and the bulk of the chloride is eliminated as HCl or chlorine gas, via displacement or oxidation by the nitric acid. Aqueous 37 percent formaldehyde is then added to the hot solution of antimony tetrahydroxide monochloride in nitric acid to destroy the remainder of the nitric acid and nitrate ion by chemical reduction with the formaldehyde. The by-products of this reaction are carbon dioxide, water and nitrogen oxides which are eliminated from the reaction vessel by evaporation. The complete elimination of the nitrates is indicated by the disappearance of the characteristic brown color of nitrogen oxide fumes. One hundred eighty-four parts of water-white glycerine is then added and the whole mixture is diluted to a total of 4000 parts by weight with dimethylformamide. The resulting clear solution is distilled under a vacuum of approximately 10 microns until the volume is reduced to 1000 parts. The product is clear and colorless, and is analyzed for antimony, water, and chloride. It is found to contain 6.1 percent antimony, 2.0 percent chloride, and approximately 0.9 percent of free water. This corresponds to approximately one chloride atom retained per pentavalent antimony, with two molecules per pentavalent antimony of glycerine coordinated to the antimony in the form of an ester. The product can be represented by the structure:

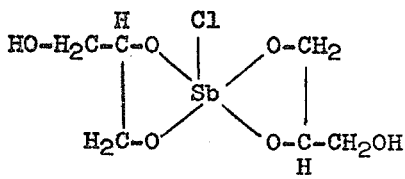

To one thousand parts of the above solution, having an initial pH as determined with a glass electrode by pH meter of 1.3, are added 41 parts of zinc oxide, and it is noted that the pH starts to rise and the temperature increases rapidly. After stirring for 20 minutes, the undissolved zinc oxide is centrifuged and recovered, and amounts to 5 parts. The centrifuged solution is analyzed and found to contain 2.01 percent chloride, 6.0 percent antimony, and 3.5 percent zinc. It now has a pH of approximately 6. The composition thus is a zinc salt of the acidic pentavalent ester of antimony with 2 moles of glycerol. It contains one mole of zinc per mole of antimony. It can be represented by the structural formula:

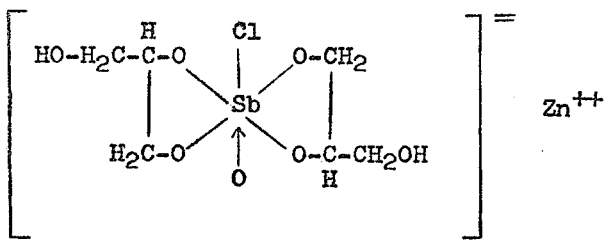

Both the glycerate ester composition and its zinc salt prepared as described above are incorporated into a copolymer of acrylonitrile with vinylidene chloride containing approximately 20 percent chlorine in the form of the vinylidene chloride species, at a level of 10 percent total antimony content, based on the weight of the polymer. This is done by dissolving the copolymer in dimethylformamide and adding a suitable quantity of the antimony glyceroxide ester or the zinc salt of the antimony glyceroxide ester.

These solutions are cast as films and dried at 125°C. for half an hour on black glass plates. They are stripped from the glass plate and tough, completely clear and colorless films are obtained. Such films are found to be self-extinguishing when ignited with a match from the bottom for a period of 3 to 5 seconds. In contrast, the unmodified polymer containing no antimony or zinc antimony compositions, but otherwise prepared in the same fashion, is found to be totally consumed in the match test.

Similar solutions are prepared and fibers are spun by pressure extrusion from a spinning dye of a polymer solution containing 30 percent by weight solids polymer and the required amount of the above antimony glyceroxide esters or their zinc salts, respectively, to give a loading of 10 percent by weight of metal on the polymer weight. The polymer is spun into a column of heated air maintained at a temperature of 140°C. and taken through a bath containing boiling water at a draw ratio of 3.5. (The draw ratio describes the length of the fiber after drawing relative to its length before drawing). Drawing 3.5 X is accomplished by exerting tension on the spun fiber via a windup reel having 3.5 times the circumference of the supply reel. Higher draw ratios can be used. As a result of this operation the fiber, which is in a softened condition just after spinning, elongates by an amount equal to the draw ratio.

The resulting fiber is dried at 140°C. and is formed into threads and knitted into fabrics of both light and heavy construction in a conventional manner. The luster and color of the fiber are evaluated and found to be at least the equivalent of control fibers containing no antimony or zinc antimony compositions of the invention. When tested in a standard 45° angle burning test (Test Method AATCC 33-1962, as described on pages B-139 to B-142 of the AATCC Technical Manual, 1968 Edition, Volume 44, Sept. 1968, published by the American Association of Textile Chemists and Colorists, Research Triangle Park, North Carolina) the fabrics are self-extinguishing.

EXAMPLE 2

Two hundred twenty-eight parts of antimony trichloride in the form of its anhydrous salt is placed in a large evaporating dish to which are added 300 parts of 70 percent nitric acid and this is heated at 80°C. for 20 minutes, during which time the antimony trichloride is oxidized to the pentavalent state and the majority of the chloride eliminated, as described in Example 1. Thirty seven percent aqueous formaldehyde solution is added to the hot solution as in Example 1, until the evolution of nitrous oxide fumes ceases, and 183 parts of ethylene glycol are then added and the composition diluted to 2000 parts with dimethylformamide. The product is somewhat cloudy at this point, possibly due to a partial hydrolysis of the glycol ester as a result of the water still retained from the water content of the nitric acid and the aqueous formaldehyde. An additional 2000 parts of dimethylformamide are added and the product distilled under vacuum until the volume is returned to 2000 parts. The product at this point is water-clear and completely colorless. Chemical analysis is performed and the antimony content is found to be 6.2 percent, while the content of chloride is found to be 2.15 percent and of water 0.47 percent. The product at this point consists of an ester of pentavalent antimony with 2 moles of ethylene glycol coordinated with the pentavalent antimony; the fifth valence of the pentavalent antimony is satisfied by the chloride ion which was not eliminated totally in the preparation. One of the initial 3 moles of ethylene glycol which are added is retained as free ethylene glycol not reacted with the antimony, according to studies performed by nuclear magnetic resonance techniques. Thus, the product can be represented by the following structural formula:

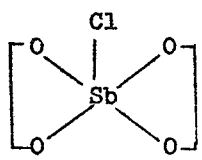

A sample of this composition is added to a solution of 30 percent of the polyacrylonitrile copolymer with vinylidene chloride described in Example 1, dissolved in dimethylformamide, in an amount such that there is 10 percent by weight of antimony based on the weight of the polymer. A sample of the resulting solution is held at 100°C. for a period of 10 hours, simulating the storage time to be anticipated in a commercial scale spinning operation. A control sample not containing any of the glycol ester of pentavalent antimony is held under the same temperature and time conditions. At the end of this time it is found that there is scarcely a perceptible development of color in the composition containing the pentavalent antimony ester of ethylene glycol, while the control sample shows a pronounced brown color. Films cast from each of these solutions and dried at 125°C. confirm the considerably improved color stability of the composition containing the acidic pentavalent antimony ester. In the standard AATCC 45° angle flammability test the acrylonitrile-vinylidene chloride copolymer burns, whereas the composition containing the pentavalent antimony ester is self-extinguishing.

To 933 parts of the above solution of ester in dimethylformamide, initially having a pH of 1.1, is added 41 parts of zinc oxide, and the zinc oxide substantially completely dissolves with the exception of approximately 5 parts, while the pH is increased to 6.0. The resulting zinc salt of the pentavalent antimony glycol ester contains 3.05 percent zinc, 5.3 percent antimony, and 1.84 percent chloride. This is equally effective as a flameproofing additive for acrylonitrile-vinylidene chloride copolymer, in that when cast into films and processed into fibers or cloth as described in Example 1, the products obtained are self-extinguishing in the AATCC 45° angle flame test.

EXAMPLE 3

Two hundred twenty-eight parts of antimony trichloride are put in a large evaporatng dish and 300 parts of 70 percent nitric acid are added, and this is heated at 80°C. for 20 minutes as described in Examples 1 and 2. The hot solution is then titrated with 37 percent aqueous formaldehyde solution until the fumes of nitric acid have ceased to evolve. To the resulting water-clear, colorless liquid are added 180 parts of ethylene glycol, representing a mole ratio of 3 moles of ethylene glycol to one of antimony +5. This composition is tested for compatibility with a variety of organic solvents by adding 3.3 parts of the composition, representing one one hundredth of the total weight of the final composition, to 25 parts of the candidate solvents. Solvents tested include formamide, dimethylsulfoxide, dimethylacetamide, tetramethylurea, monomethylformamide, ethylene glycol, 2,2'-oxydiethanol, or diethylene glycol, glycerine, formic acid, and dimethylformamide. It is found to form clear, colorless solutions with ethylene glycol, diethylene glycol, glycerine, formic acid, and dimethylformamide. While it forms initially clear solutions with formamide, dimethylsulfoxide and monomethylformamide, these, upon storage are found to gel. The product forms immediate white precipitates with dimethylacetamide and tetramethylurea. These results indicate that, in the presence of approximately 17 percent water as is contained in this composition, it is only compatible with ethylene glycol, diethylene glycol, glycerine, and formic acid and dimethylformamide.

EXAMPLE 4

Two hundred twenty-eight parts of antimony trichloride are placed in a large evaporating dish, and 300 parts of 70 percent nitric acid are added and the composition heated on a steam bath for 20 minutes, and titrated with 37 percent formaldehyde solution, as described in previous examples. One hundred twenty-two parts of ethylene glycol by weight and approximately 1000 parts of ethyl alcohol are then added. This is distilled under vacuum to a final weight of 326 parts. 3.3 parts of this product are added to 25 parts of the solvents noted in Example 3, and it is now found that in the absence of any excess water, the composition is completely stable and clear, with formamide, methylformamide, and dimethylsulfoxide, as well as the other solvents with which the water-containing composition is compatible, including DMF, glycerol, ethylene glycol, diethylene glycol, and formic acid. Additional tests show that it is incompatible with ethanol, methanol, acetonitrile, glacial acetic acid, furfural and methyl formate. It will be noted that every solvent with which the composition is compatible has a dielectric constant at room temperature and $10^4$ to $10^5$ cycles per second in excess of 35 electrostatic units (ESU), and has a ratio of carbon to the sum of hetero atoms including oxygen, nitrogen and sulfur contained in the molecule of less than 1.7. Solvents with which the composition is incompatible either have ratios in excess of 1.7, or dielectric constants less than 35, or both.

EXAMPLE 5

This represents an example of the case in which only one mole of ethylene glycol is used per mole of antimony +5 to stabilize the composition and the remaining valences are satisfied by halogen and alkoxy. Six-tenths mole of antimony tetrahydroxide monochloride is prepared by a reaction between antimony trichloride and nitric acid, followed by destruction of the excess nitric acid by the addition of formaldehyde, as in previous examples. To this are added 36 grams of ethylene glycol and 350 ml. of ethanol. This is distilled under vacuum (10 microns pressure) until the temperature reaches 28°C. and 1000 cc. of DMF are then added. At this point the solution turns somewhat milky. Distillation is continued and the solution clears up completely. Distillation is stopped at 55°C. and 260 grams of product consisting of a dimethylformamide solution of the ester of 1 molecule of ethylene glycol per one atom of antimony +5 are recovered. The product has the following structural formula:

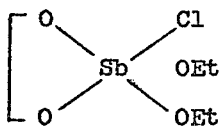

The solution at this point is 2.4 molar with respect to antimony. The solution is mixed with a 30 percent solution in DMF of an acrylonitrile-vinylidene chloride copolymer containing 20 percent chloride in the form of vinylidene chloride, the solutions are mixed in proper proportions to provide 10 percent by weight of antimony in the polymer, based on the polymer weight. A film cast from this polymer solution is found to be self-extinguishing in the AATCC 45° angle flame test. After boiling with water for 30 minutes the film is again tested, and again found to be self-extinguishing in the 45° angle test.

EXAMPLE 6

Two hundred twenty-eight grams of antimony trichloride are reacted with 300 grams of nitric acid for 20 minutes at 80°C. and 37 percent aqueous formaldehyde solution is then added until the fumes of nitrogen oxide cease evolving. This gives approximately 300 grams of product. This is split into two 150 gram portions and to one, 1.5 moles of 1,2-propanediol is added, whereas to the other, 1.5 moles of 2,3-butanediol is added. In both cases, completely clear solutions are obtained. These are mixed with 1000 cc. each of dimethylformamide and distilled until the temperature reaches 55°C. under a vacuum of 10 microns pressure. The resulting products have the following structural formulae:

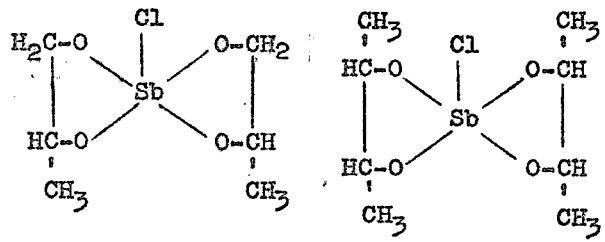

In each case, the remaining mole of the polyol is present as the free polyol, as shown by nuclear magnetic resonance studies.

These are added to a vinylidene chloride polyacrylonitrile copolymer containing 20 percent chloride, as described in previous examples, and give clear, lustrous films which are self-extinguishing in the 45° angle and vertical flame tests, as in previous examples.

It should be noted that 1,4-butanediol, which contains nonvicinal hydroxide groups does not form a comparable stable complex or ester and gives a white precipitate of antimony oxide on heating with DMF. When the latter material is suspended and added to a polyacrylonitrile-vinylidene chloride copolymer in the manner of previous examples, the films obtained after drying are badly delustered. They are also not as efficient as flame-proofing agents as the compositions of previous examples.

Entirely similar results are obtained when using 1,3-propanediol instead of 1,2-propanediol. That is, it is found that instead of a clear, stable composition being formed, a hazy, cloudy solution is formed. This, in turn, gives a badly delustered film when mixed with an acrylonitrile-vinylidene chloride copolymer in the fashion of previous examples.

These results illustrate the necessity of having vicinal hydroxyl groups in order to prepare the preferred stable, clear compositions of this invention.

EXAMPLE 7

One gram of antimony pentaethoxide ($2.88 \times 10^{-3}$ moles), 0.54 grams ethylene glycol ($8.64 \times 10^{-3}$ moles), 0.26 grams distilled water ($14.4 \times 10^{-3}$ moles) are added to 50 cc. of dimethylformamide (DMF) in a 100 cc. flask. The contents are heated to 108°–123°C., and all the water and about half the DMF are removed by distillation under reduced pressure (200 mm. Hg). After removal of distillate a clear, colorless solution is obtained which contains 2.5 percent by weight of antimony ethylene glycol ester in DMF. The ester has the structural formula:

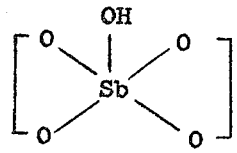

EXAMPLE 8

A mixture of 10.4 g. antimony pentaethoxide (0.03 moles), 1.87 g. ethylene glycol (0.03 moles) and 100 cc. DMF are placed into a 250 cc. round bottom flask. Ethanol and DMF are removed by vacuum distillation (11 mm. Hg) at room temperature, the last traces of solvent being removed at 0.5 mm. Hg. The product is a pure white solid of the formula:

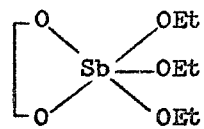

EXAMPLE 9

Two parts of a solution of pentavalent antimony glycoxide in dimethylformamide prepared as described in Example 2 and containing 6.2 percent antimony by analysis is added to 1.5 parts of polyvinyl chloride dissolved in 10.9 parts of hot dimethylformamide. The clear solution is poured onto a pyrex plate and dried in a circulating oven for 30 minutes at 120°C. to give a clear, lustrous film. The film is self-extinguishing in the AATCC 45° angle flame test. A film similarly prepared from a dispersion of 0.12 parts of a commercial antimony oxide powder (B&A reagent grade), in a solution of 1.5 parts of polyvinyl chloride dissolved in 10 parts of dimethylformamide is delustered and is inferior in the flame test to the film prepared using the antimony glycoxide although the antimony content of the film is similar.

Two parts of a solution of pentavalent glycoxide in dimethylformamide prepared as described above, is added to 1.5 parts of methyl methacrylate and 0.2 parts of powdered Chlorowax 70 (a chlorinated hydrocarbon wax supplied by the Diamond Chemical Co.) dissolved in 10 parts of hot dimethylformamide. The clear solution is poured onto a pyrex plate and dried in a circulating oven for 30 minutes at 120°C. to give a clear, lustrous film. The film is self-extinguishing in the AATCC 45° angle flame test. A film containing a similar amount of antimony prepared from a dispersion of a commercial antimony oxide powder as described above is delustered, and shows inferior flame resistance in the flame test to the film containing the antimony glycoxide.

Two parts of a solution of pentavalent antimony glycoxide in dimethylformamide prepared as described above is added to 1.5 parts of an acrylonitrile-butadiene-styrene copolymer and 0.2 parts of Chlorowax 70 dissolved in 10 parts of hot dimethylformamide. The solution is poured onto a pyrex plate and dried in a circulating oven for 30 minutes at 120°C. to give a slightly hazy film. The film is self-extinguishing in the AATCC 45° angle flame test.

Two parts of a solution of pentavalent antimony glycoxide in dimethylformamide prepared as described above is added to 1.5 parts of polystyrene and 0.2 parts of powdered Chlorowax 70 is dissolved in 10.9 parts of hot dimethylformamide. The clear solution is poured onto a pyrex plate and dried in a circulating oven for 30 minutes at 120°C. to give a clear, lustrous film. The film is self-extinguishing in the AATCC 45° angle flame test. A polystyrene film containing a similar amount of antimony added in the form of a commercial antimony oxide powder is delustered, and has inferior flame resistance in the flame test to the film containing the antimony glycoxide.

Eight parts of a solution of pentavalent antimony glycoxide in dimethylformamide prepared as described above is added to 10 parts of Paraplex P-43 (a maleic anhydride-ethylene glycol-styrene composition supplied by the Rohm & Haas Co.), one part of powdered Chlorowax 70 and 0.05 parts of benzoyl peroxide at 60°C. The resulting solution is poured onto a pyrex plate and heated in an oven at 100°-110°C. for about 20 minutes to polymerize the composition. A clear, lustrous polyester film is obtained, which is self-extinguishing in the AATCC 45° angle flame test.

Two parts of a solution of pentavalent antimony glycoxide in dimethylformamide prepared as described above is added to 1.5 parts of polyurethane (Helastic LS-13160, supplied by the Wilmington Chemical Corporation) and 0.2 parts of powdered Chlorowax 70 dissolved in 10 parts of dimethylformamide. A clear, lustrous film prepared as described above is self-extinguishing in the AATCC 45° angle flame test.

We claim:

1. A compound selected from the group consisting of
   a. salts of zinc oxide and hydroxide and stannous oxide and hydroxide with esters of pentavalent antimony having the structural formula:

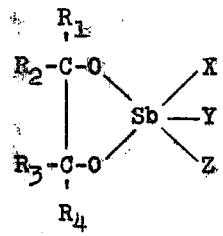

wherein
$R_1$, $R_2$, $R_3$ and $R_4$ are hydrogen, alkyl of 1 through 4 carbon atoms, or hydroxyalkyl of 1 through 4 carbon atoms, with the proviso that the total number of carbon atoms in $R_1$, $R_2$, $R_3$ and $R_4$ does not exceed 4;

Z is chloro, bromo, iodo, hydroxyl, or alkoxy of 1 through 4 carbon atoms;

X and Y when taken separately are the same or different and are chloro, bromo, iodo, or alkoxy of 1 through 4 carbon atoms and when taken together are

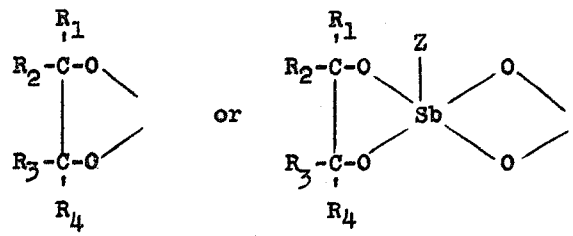

wherein
$R_1$, $R_2$, $R_3$, $R_4$ and Z are as defined above;

b. and mixed esters composed of pentavalent antimony esters of (a) in combination with trivalent antimony esters of aliphatic polyhydroxy compounds having vicinal hydroxyl groups and containing 2 through 6 carbon atoms, at least 20 mole percent of the antimony being present as pentavalent antimony ester.

2. A mixed ester composed of esters of pentavalent antimony having the structural formula:

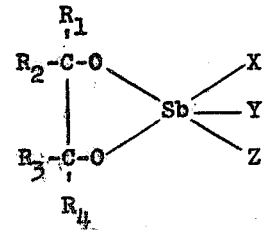

wherein
$R_1$, $R_2$, $R_3$ and $R_4$ are hydrogen, alkyl of 1 through 4 carbon atoms, or hydroxyalkyl of 1 through 4 carbon atoms, with the proviso that the total number of carbon atoms in $R_1$, $R_2$, $R_3$ and $R_4$ does not exceed 4;

Z is chloro, bromo, iodo, hydroxyl, or alkoxy of 1 through 4 carbon atoms;

X and Y when taken separately are the same or different and are chloro, bromo, iodo, or alkoxy of 1 through 4 carbon atoms and when taken together are

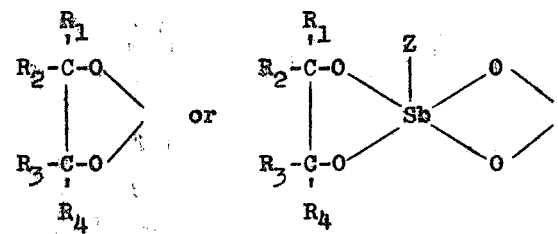

wherein
$R_1$, $R_2$, $R_3$, $R_4$ and Z are as defined above in combination with trivalent antimony esters of aliphatic polyhydroxy compounds having vicinal hydroxyl groups and containing 2 through 6 carbon atoms, at least 20 mole percent of the antimony being present as pentavalent antimony ester.

3. A solution of a mixed ester or mixture of mixed esters of claim 2 in a polar organic solvent, the mole ratio of antimony to the aliphatic polyhydroxy component of the mixed esters being in the range of 1:1 to 1:2.

4. A solution of a mixed ester or mixture of mixed esters of claim 2 in a polar organic solvent having a dielectric constant measured at 25°C. and $10^4$ to $10^5$ cps. greater than 35 ESU and a ratio of carbon atoms to hetero atoms less than 1.7, the mole ratio of antimony to the aliphatic polyhydroxy component of the mixed esters being in the range of 1:1 to 1:2.

5. A solution of claim 4 in which the solvent is at least one member of the group consisting of formic acid, formamide, methylformamide, dimethylformamide, acetamide, ethylene glycol, glycerol, diethylene glycol, 1,3-propanediol, 1,2-propanediol, and dimethylsulfoxide.

6. A solution of claim 4 wherein the solvent is selected from dimethylformamide and dimethylsulfoxide.

7. A method of making mixed esters of pentavalent antimony and trivalent antimony with aliphatic polyhydroxy compounds containing 2 through 6 carbon atoms and having vicinal hydroxyl groups, which comprises mixing a pentavalent antimony ester having the structural formula:

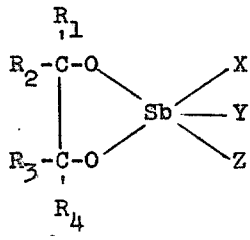

wherein

R$_1$, R$_2$, R$_3$ and R$_4$ are hydrogen, alkyl of 1 through 4 carbon atoms, or hydroxyalkyl of 1 through 4 carbon atoms, with the proviso that the total number of carbon atoms in R$_1$, R$_2$, R$_3$ and R$_4$ does not exceed 4;

Z is chloro, bromo, iodo, hydroxyl, or alkoxy of 1 through 4 carbon atoms;

X and Y when taken separately are the same or different and are chloro, bromo, iodo, or alkoxy of 1 through 4 carbon atoms and when taken together are

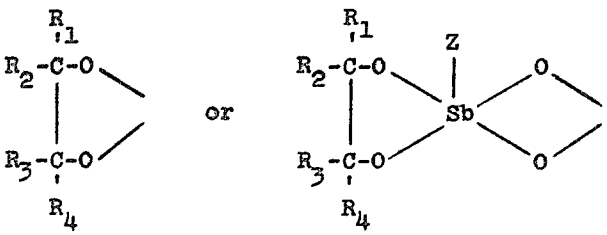

wherein

R$_1$, R$_2$, R$_3$, R$_4$ and Z are as defined above with a trivalent antimony ester of a polyhydroxy compound as defined above in a polar organic solvent, the proportion of pentavalent antimony ester to trivalent antimony ester being such that at least 20 mole percent of the total antimony present is pentavalent antimony.

8. Method of claim 7 wherein the polyhydroxy compound is ethylene glycol.

9. Method of claim 7 wherein the polyhydroxy compound is glycerol.

* * * * *